United States Patent [19]

Miyaguchi

[11] Patent Number: 5,570,196
[45] Date of Patent: Oct. 29, 1996

[54] TELEVISION RECEIVER INCORPORATING VIDEO RECORDING AND REPRODUCING APPARATUS

[75] Inventor: Hisashi Miyaguchi, Takatsuki, Japan

[73] Assignee: Matsushita Electric Industrial Co., Ltd., Osaka, Japan

[21] Appl. No.: 462,612

[22] Filed: Jun. 5, 1995

[30] Foreign Application Priority Data

Jun. 7, 1994 [JP] Japan .................................. 6-125069

[51] Int. Cl.$^6$ .................................................. H04N 9/79
[52] U.S. Cl. ................... 386/1; 348/725; 348/553
[58] Field of Search ........................... 358/310; 348/725, 348/552, 553, 554

[56] References Cited

U.S. PATENT DOCUMENTS 5,233,434  8/1993  Furuki et al. ............................ 358/310
5,432,612  7/1995  Takashimisu et al. ................... 358/310

*Primary Examiner*—Thai Q. Tran
*Assistant Examiner*—Luanne P. Din
*Attorney, Agent, or Firm*—Ratner & Prestia

[57] ABSTRACT

A video signal from a tuner or an input terminal is provided to a second color system circuit and a first color system circuit. The video signal provided to the second color system circuit is recorded in a video recording and reproducing apparatus after the color system is set based on a control signal from a second color system control data output circuit. The color system information discriminated in the second automatic color system discriminating circuit controls the second color system control data output circuit. The video signal input to the first color system circuit is processed based on a control signal from a first color system control data output circuit. The color system information discriminated in the first automatic color system discriminating circuit controls the first color system control data output circuit. The color system information discriminated in the first automatic color system discriminating circuit, and the color system information held in a color system information circuit are compared in a color system comparator. If it is determined that the second automatic color system discriminating circuit cannot discriminate the color system, a color control data output circuit is actuated to control the color adjusting circuit so that the video signal may be in an abnormal state. The video signal is provided to a display device to warn the user.

5 Claims, 3 Drawing Sheets

TELEVISION RECEIVER INCORPORATING VIDEO RECORDING AND REPRODUCING APPARATUS

BACKGROUND OF THE INVENTION

The invention relates to a television receiver incorporating a video recording and reproducing apparatus capable of discriminating and receiving two or more different television standard systems such as NTSC, PAL, and SECAM, and recording and reproducing the video signals. In particular, the television receiver incorporates a video recording and reproducing apparatus comprising two or more automatic color system discriminating circuits having different discriminating capacities for discriminating different television standard systems.

A conventional television receiver incorporating a video recording and reproducing apparatus comprising an automatic color system discriminating circuit is shown in FIG. 1.

In FIG. 1, a tuner IF circuit 101 includes a tuner for receiving input television signals from an antenna and an IF circuit for converting the received signals to intermediate frequency signals and amplifying and detecting the IF signals. An output video signal from tuner IF circuit 101 or a video signal from video signal input terminal 116 is selected by a video signal changeover switch 114 and a video signal changeover switch 113, and is fed into a second color system circuit 102 and a first color system circuit 106.

The video signal fed into the second color system circuit 102 is provided to a second automatic color system discriminating circuit 103. A second color system control data output circuit 105 is controlled by the color system information discriminated by the second automatic color system discriminating circuit 103. The color system corresponding to the standard system of the input video signal is set by the second color system circuit 102 based on the control signal generated in the second color system control data output circuit 105. The output of the second color system circuit 102 is recorded in a video recording and reproducing apparatus (for example, video tape recorder) 104.

On the other hand, the video signal fed into the first color system circuit 106 is provided to a first automatic color system discriminating circuit 107. The color system information discriminated by the first automatic color system discriminating circuit 107 is provided to a first color system control data output circuit 109 as a control signal. The color system corresponding to the standard system of the input video signal is set in the first color system circuit 106 based on a control signal output by the first color system control data output circuit 109. The output of first color system circuit 106 is fed into an adjusting circuit 110 which adjusts the color on the basis of a control signal from control data output circuit 115. The video signal is reproduced on the CRT 111 after color adjustment.

However, the color system of the video signal may be discriminated in the first automatic color system discriminating circuit 107 but not discriminated in the second automatic color system discriminating circuit 103 due to differences in their discriminating ability. If the color system is correctly discriminated, the television circuit for driving the CRT generally contains a deflection circuit, and the result of the color system discrimination is accurately reflected in the output video signal easily. Unfortunately, the setting of the color system tends to be improper at the color system circuit 102 side of the video recording and reproducing apparatus. The video signal produced from the color system circuit 102 is often stored in the video recording and reproducing apparatus 104 as a picture of abnormal color (for example, colorless). The reproduced video signal from the video recording and reproducing apparatus 104 is directly reproduced in the CRT 111 as picture of abnormal color.

In the conventional television receiver incorporating video recording and reproducing apparatus, if the video signal color system cannot be discriminated in the first automatic color system discriminating circuit 107, an abnormal image is reproduced in the CRT 111, which notifies the viewer that the color system cannot be discriminated. Whether the color system can be correctly discriminated in the second automatic color system discriminating circuit 103 or whether the color is restored normally or not in the second color system 102 is known only after the video signal recorded in video recording and reproducing apparatus is reproduced in the CRT 111. Only then is it known that the recorded video signal is abnormal.

SUMMARY OF THE INVENTION

The present invention solves the conventional problems by notifying the user in advance of abnormality, if any, in the color of the video signal before the video signal is recorded.

A first embodiment of the television receiver incorporating a video recording and reproducing apparatus of the invention comprises:

a first automatic color system discriminating circuit for discriminating a color system of an input video signal, a first color system control data output circuit for applying color system control data to a first color system circuit based on the color system discrimination by the first automatic color system discriminating circuit, and setting the color system, a second automatic color system discriminating circuit for discriminating a color system of an input video signal, a second color system control data output circuit for applying color system control data to a second color system circuit based on the color system discrimination by the second automatic color system discriminating circuit, and setting the color system, a video recording and reproducing apparatus for recording an output video signal of the second color system circuit, color system information means for storing color system information for determining the accuracy of the color system discrimination by the second automatic color system discriminating circuit, a color system comparator for comparing the color system information discriminated by the first automatic color system discriminating circuit and the color system information stored in the color system information means, and issuing a control signal when the second automatic color system discriminating circuit cannot discriminate the color system, a color adjusting circuit for adjusting the color of an output of the first color system circuit, a color control data output circuit for receiving the control signal from the color system comparator, and controlling the adjustment by the color adjusting circuit, and a display device for receiving the output of the color adjusting circuit, and reproducing the input video signal.

In a second embodiment of the invention, the color system information means in the first embodiment is eliminated. The color system comparator compares the color system information judged by the first automatic color system discriminating circuit and the color system information discriminated by the second automatic color system discriminating circuit, and issues a control signal when the second automatic color system discriminating circuit cannot discriminate the color system.

In both the first and second embodiments, when the color system comparator generates a control signal indicating that the second automatic color system discriminating circuit cannot discriminate the color system, the color adjusting circuit is controlled by the color control data output circuit, and accordingly the color of the picture displayed on the display device is adjusted. The color adjusting circuit is controlled to show an abnormal picture on the display device to the user.

Therefore, when the user records the picture in the video recording and reproducing apparatus, the abnormal display gives a warning so that the abnormal color signal is not recorded due to the inability of the second automatic color system discriminating circuit to discriminate the color system. The user can then set the proper processing before recording.

DETAILED DESCRIPTION OF THE INVENTION

Figure 1:
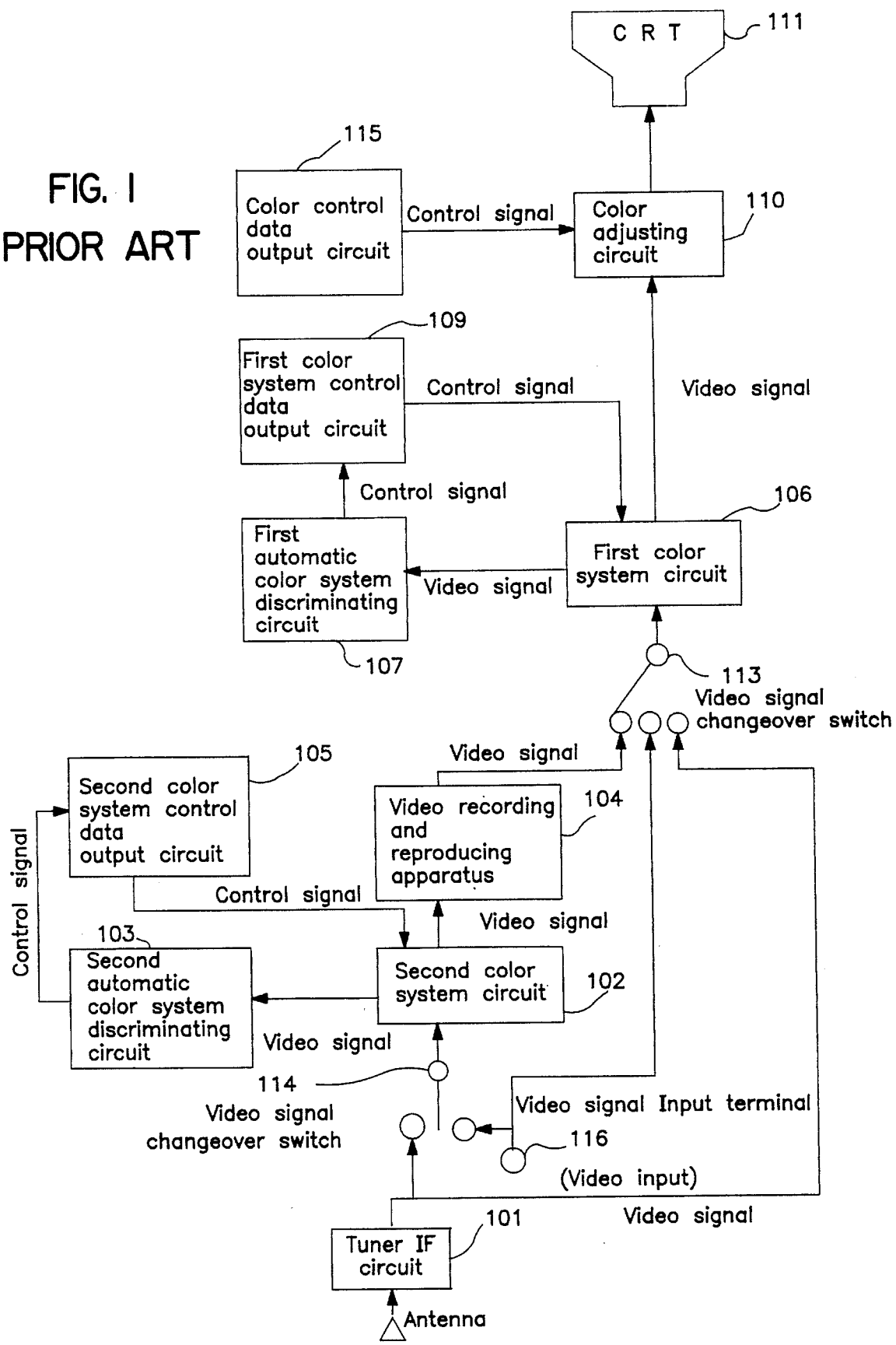
FIG. 1 is a block diagram of a conventional television receiver incorporating video recording and reproducing apparatus.

Referring now to the drawings, embodiments of a television receiver incorporating video recording and reproducing apparatus of the present invention are described below.

Embodiment 1

Figure 2:
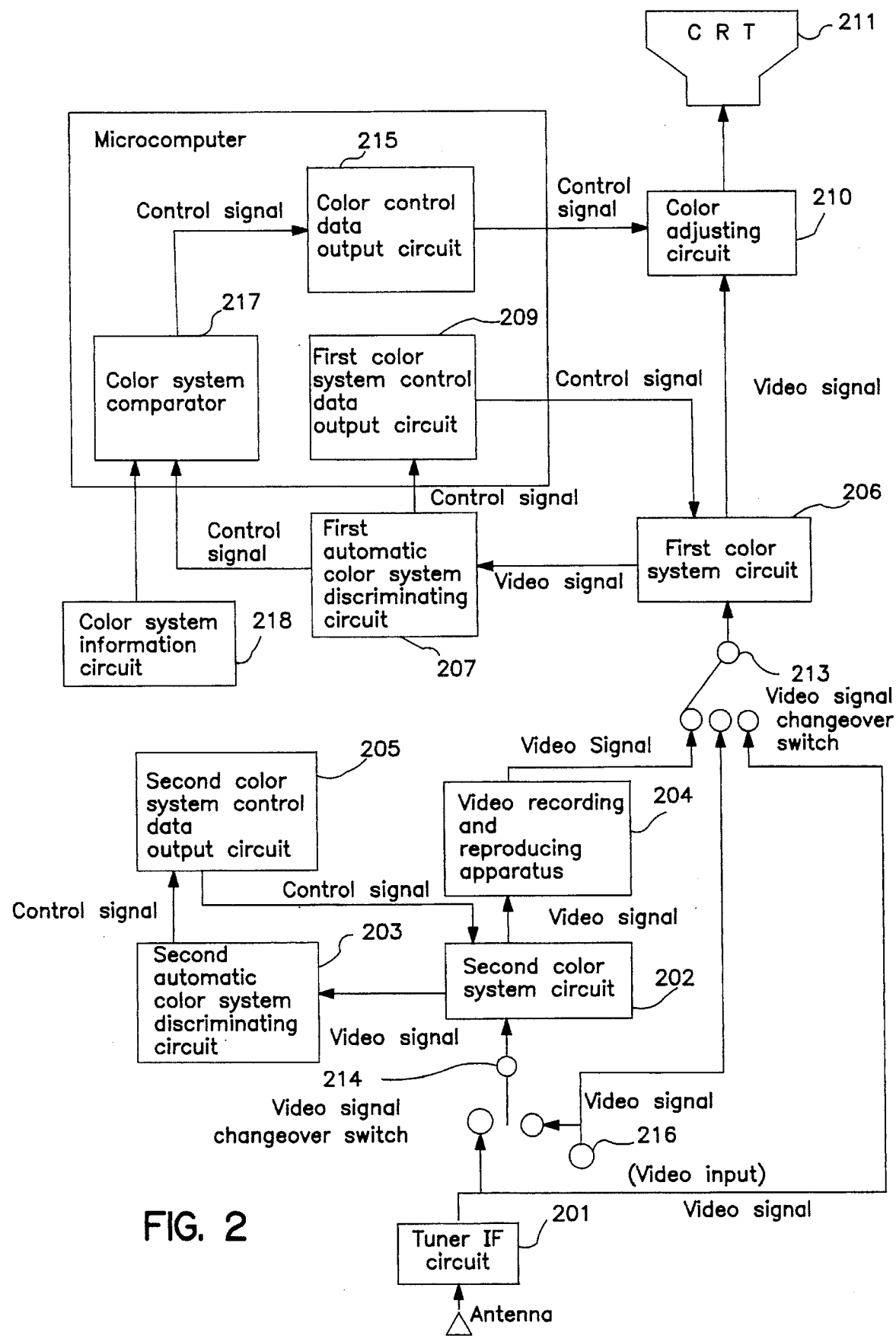
FIG. 2 is a block diagram of a television receiver incorporating video recording and reproducing apparatus in a first embodiment of the invention.

FIG. 2 is a block diagram of a television receiver incorporating video recording and reproducing apparatus in a first embodiment of the invention.

Control signals provided from a first automatic color system discriminating circuit 207 and from a color system information circuit 218 are compared at a color system comparator 217.

A comparison output of the color system comparator 217 is given to a color control data output circuit 215. The output of the color control data output circuit 215 is provided to a color adjusting circuit 210, where the color of a video signal from first color system circuit 206 is adjusted and issued to a CRT 211.

As shown in FIG. 2, a first color system control data output circuit 209, the color system comparator 217, and color control data output circuit 215 may be implemented in a microcomputer. Other constituent parts may also be implemented in a microcomputer.

In FIG. 2, the output video signal of the tuner IF circuit 201 for receiving, amplifying and detecting the input television signal from the antenna, or a video signal from a video signal input terminal 216 is selected by a video signal changeover switch 214 and a video signal changeover switch 213, and is fed into a second color system circuit 202 and a first color system circuit 206.

The video signal fed into the second color system circuit 202 is provided to a second automatic color system discriminating circuit 203. A second color system control data output circuit 205 is controlled by the color system information discriminated by the second automatic color system discriminating circuit 203. The color system corresponding to the standard system of the input video signal is set by the second color system circuit 202 based on the control signal generated in the second color system control data output circuit 205. The video signal output by second color system circuit 202 is recorded and reproduced in a video recording and reproducing apparatus (for example, video tape recorder) 204.

Video signal changeover switch 213 switches between the video signal from the tuner IF circuit 201, the video signal from the video signal input terminal 216, and the video signal from the video recording and reproducing apparatus 204. The selected video signal is provided to the first color system circuit 206 and to the first automatic color system discriminating circuit 207.

The color system information discriminated by the first automatic color system discriminating circuit 207 is a control signal for the first color system control data output circuit 209. The color system is set according to the standard system of the input video signal in the first color system circuit 206 on the basis of a control signal from the first color system control data output circuit 209.

When setting of the color system is automatic, the color system is set by the color system information discriminated by the second automatic color system discriminating circuit 203 and first automatic color system discriminating circuit 207.

Color system information circuit 218 stores, for example, in a memory, color system information that cannot be discriminated by the second automatic color system discriminating circuit 203.

The color system information discriminated in the first automatic color system discriminating circuit 207 is provided to a color system comparator 217. This information and the color system information held in color system information circuit 218 are compared in the color system comparator 217. If the color system information discriminated in first automatic color system discriminating circuit 207 matches the color system information stored in color system information circuit 218, it is determined that the second automatic color system discriminating circuit 203 cannot discriminate the color system.

Alternatively, the color system information circuit 218 may store color system information that can be discriminated by the second automatic color system discriminating circuit 203. If the color system information discriminated in the first automatic color system discriminating circuit 207 does not match the color system information stored in color system information circuit 218, it is determined that the second automatic color system discriminating circuit 203 cannot discriminate the color system.

If the second automatic color system discriminating circuit 203 cannot discriminate the color system, a control signal is generated by the color system comparator 217 and provided to color control data output circuit 215. Another control signal is generated by color control data output circuit 215, and is provided to color adjusting circuit 210 for adjusting the color of the video signal entered from the first color system circuit 206. The color adjusting circuit 210 may be adjusted so that the color of the video signal is abnormal, for example, in a colorless state.

As a result, a colorless video signal is displayed on a CRT 211, and the user knows that the video information produced from the second color system circuit 202 and entered into the video recording and reproducing apparatus 204 will be recorded as a signal of abnormal color (for example, colorless). The user can either adjust the color of the signal to be recorded in the video recording and reproducing apparatus 204 by adjusting the second color system circuit 202 or the like, or, if adjustment is impossible, stop the recording operation of the video recording and reproducing apparatus 204.

Embodiment 2

Figure 3:
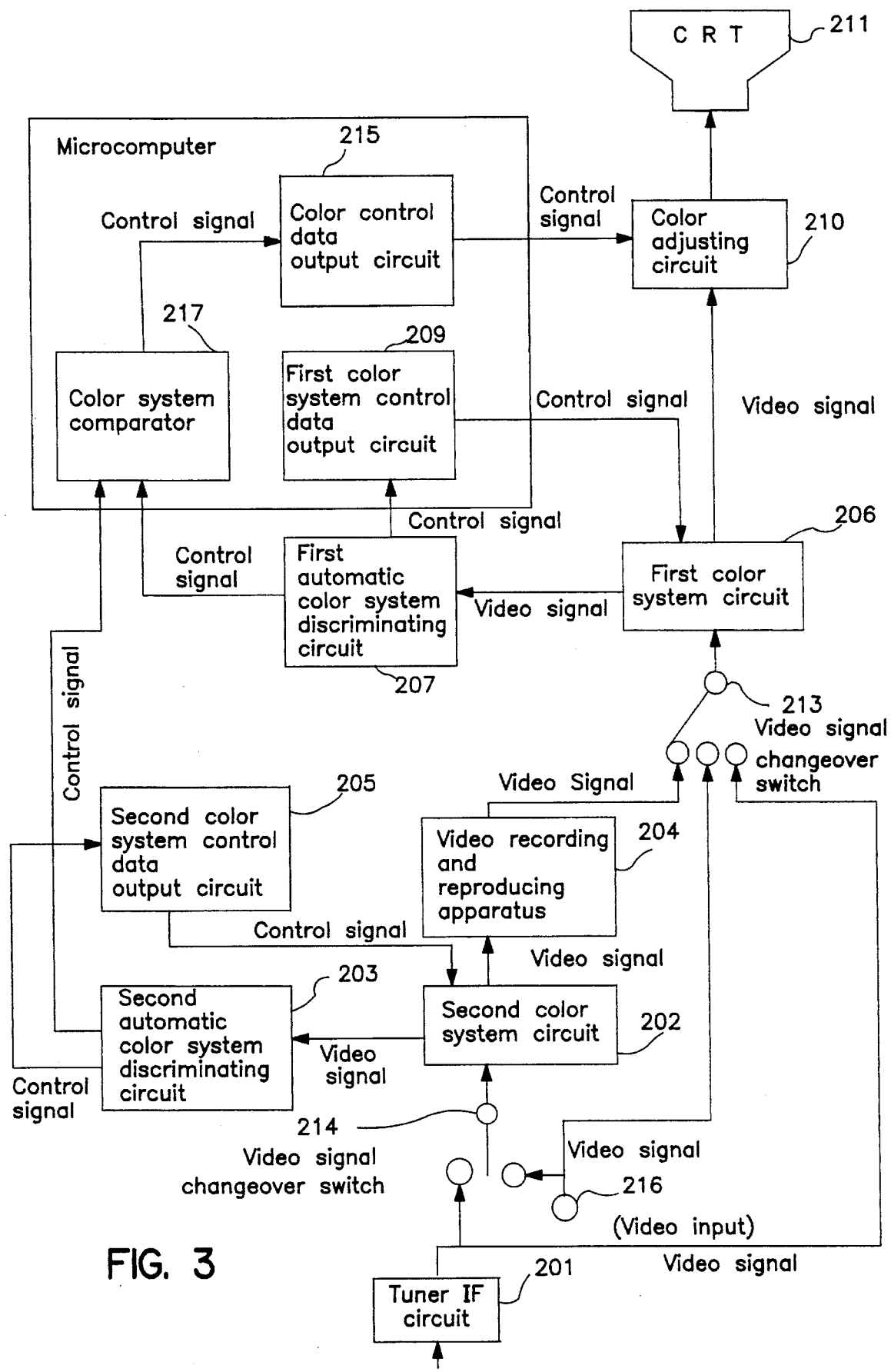
FIG. 3 is a block diagram of a television receiver incorporating video recording and reproducing apparatus in a second embodiment of the invention.

FIG. 3 is a block diagram of a television receiver incorporating a video recording and reproducing apparatus in a second embodiment of the invention.

In FIG. 3, components with the same functions as in the first embodiment in FIG. 2 are identified with same reference numerals, and their explanations are omitted.

In this embodiment, the color system information circuit 218 is eliminated. The discriminating information of the second automatic color system discriminating circuit 203 for discriminating the color system of the input video signal in the second color system circuit 202 is applied to the color system comparator 217 as a control signal.

In the color system comparator 217, the color system information discriminated in the first automatic color system discriminating circuit 207 and the color system information discriminated in the second automatic color system discriminating circuit 203 are compared. When the result of a comparison is different, the color system comparator 217 determines that the second automatic color system discriminating circuit 203 cannot discriminate the color system.

The output of the color system comparator 217 controls the color control data output circuit 215. The color adjusting circuit 210 is controlled so that the video signal entered from the first color system circuit 206 is colorless.

As a result, a colorless video signal is reproduced in the CRT 211. Seeing it, the user knows that the video information produced from the second color system circuit 202 and entered into the video recording and reproducing apparatus 204 will be recorded as a signal of abnormal color (for example, colorless). The user can adjust the color of the signal to be recorded in the video recording and reproducing apparatus 204 by adjusting the second color system circuit 202 or the like.

Thus, according to the invention, in the case where the discriminating ability differs between the first automatic color system discriminating ability for sending the video signal to the CRT, and the second automatic color system discriminating circuit for sending the video signal to the video recording and reproducing apparatus, in order to avoid the problem of abnormal reproduced images in the video recording and reproducing apparatus in spite of normal display on the CRT, or failure in video recording while not knowing that the automatic color system discriminating circuit for sending the video signal to the video recording and reproducing circuit cannot discriminate the input video signal, the abnormality of the video signal to be recorded is shown to the user through the CRT before recording the video signal in the video recording and reproducing apparatus.

The warning to the user, instead of a colorless display may be an abnormal color tinted display.

The display device is not limited to the CRT, but any means capable of reproducing the video signal may be used.

The circuits and other components are not limited to the illustrated embodiments alone, and various changes and modifications are possible within the scope of true spirit of the invention.

What is claimed:

1. A television receiver incorporating a video recording and reproducing apparatus comprising:

a first automatic color system discriminating circuit for discriminating a color system of an input video signal, a first color system control data output circuit for applying color system control data to a first color system circuit based on the color system discrimination by the first automatic color system discriminating circuit, and setting the color system, a second automatic color system discriminating circuit for discriminating a color system of an input video signal, a second color system control data output circuit for applying color system control data to a second color system circuit based on the color system discrimination by the second automatic color system discriminating circuit, and setting the color system, a video recording and reproducing apparatus for recording an output video signal of the second color system circuit, color system information means for storing color system information for determining the accuracy of the color system discrimination by the second automatic color system discriminating circuit, a color system comparator for comparing the color system information discriminated by the first automatic color system discriminating circuit and the color system information stored in the color system information means, and issuing a control signal when the second automatic color system discriminating circuit cannot discriminate the color system, a color adjusting circuit for adjusting the color of an output of the first color system circuit, a color control data output circuit for receiving the control signal from the color system comparator, and controlling the color adjustment by the color adjusting circuit, and a display device for receiving the output of the color adjusting circuit, and reproducing the picture.

2. A television receiver incorporating a video recording and reproducing apparatus comprising:

a first automatic color system discriminating circuit for discriminating a color system of an input video signal, a first color system control data output circuit for applying color system control data to a first color system circuit based on the color system discrimination by the first automatic color system discriminating circuit, and setting the color system, a second automatic color system discriminating circuit for discriminating a color system of an input video signal, a second color system control data output circuit for applying color system control data to a second color system circuit based on the color system discrimination by the second automatic color system discriminating circuit, and setting the color system, a video recording and reproducing apparatus for recording an output video signal of the second color system circuit, a color system comparator for comparing the color system information discriminated by the first automatic color system discriminating circuit and the color system information discriminated by the second automatic color system discriminating circuit, and providing a control signal when the color system information discriminated by the first automatic color system discriminating circuit does not match the color system information discriminated by the second automatic color system discriminating circuit, a color adjusting circuit for adjusting the color of an output of the first color system circuit, a color control data output circuit for receiving the control signal from the color system comparator, and controlling the color adjustment by the color adjusting circuit, and a display device for receiving the output of the color adjusting circuit, and reproducing the picture.

3. A television receiver incorporating a video recording and reproducing apparatus of claim 1, wherein the color system information means stores the color system information that cannot be discriminated by the second automatic color system discriminating circuit.

4. A television receiver incorporating a video recording and reproducing apparatus of claim 1, wherein the color system information means stores the color system information that can be discriminated by the second automatic color system discriminating circuit.

5. A television receiver incorporating a video recording and reproducing apparatus of claim 1 or 2, wherein the color system comparator sends a control signal to the color control data output circuit so that the video signal output by the color adjusting circuit may be colorless when the second automatic color system discriminating circuit cannot discriminate the color system.

* * * * *

UNITED STATES PATENT AND TRADE MARK OFFICE
CERTIFICATE OF CORRECTION

PATENT NO.   : 5,570,196
DATED        : October 29, 1996
INVENTOR(S)  : Miyaguchii It is certified that error appears in the above-identified patent and that said Letters Patent is hereby corrected as shown below:

On the Cover Page, item [56] Refererences Cited, the following references need to be added:

FOREIGN PATENT DOCUMENTS 3-21193    1/1991    Japan
2-295343   12/1990   Japan
4-168684   6/1992    Japan Signed and Sealed this Eighth Day of April, 1997

Attest:

BRUCE LEHMAN

*Attesting Officer*    Commissioner of Patents and Trademarks